United States Patent [19]

Livingston

[11] Patent Number: 4,606,721
[45] Date of Patent: Aug. 19, 1986

[54] COMBUSTION CHAMBER NOISE SUPPRESSOR

[75] Inventor: Arnold M. Livingston, Millington, N.J.

[73] Assignee: Tifa Limited, Millington, N.J.

[21] Appl. No.: 669,186

[22] Filed: Nov. 7, 1984

[51] Int. Cl.$^4$ .............................................. F23C 9/02
[52] U.S. Cl. ............................... 431/116; 431/351;
431/115; 60/725; 60/752
[58] Field of Search .............. 431/114, 115, 351, 353,
431/242, 243, 116; 60/725, 760, 732, 752, 753,
750, 759; 181/198, 204, 229

[56] References Cited

U.S. PATENT DOCUMENTS

| | | | |
|---|---|---|---|
| 2,117,270 | 5/1938 | Bloom | 431/354 |
| 2,164,954 | 7/1939 | Stephens | 431/351 |
| 2,206,553 | 7/1940 | Nagel | 431/351 |
| 2,958,194 | 11/1960 | Bayley | 60/760 |
| 3,266,550 | 8/1966 | Sick et al. | 431/115 |
| 3,333,414 | 8/1967 | Saintbury | 60/760 |
| 3,414,362 | 12/1968 | Schoppe | 431/353 |
| 3,439,991 | 4/1969 | Fathauer | 431/115 |
| 3,720,497 | 3/1973 | Arenson | 431/114 |
| 3,754,393 | 8/1973 | Handa | 60/750 |
| 3,826,083 | 7/1974 | Brandon et al. | 431/116 |
| 3,840,332 | 10/1974 | Smith | 431/351 |
| 4,050,238 | 9/1977 | Holzapfel | 431/116 |
| 4,113,425 | 9/1978 | Vonlinde et al. | 431/173 |
| 4,277,942 | 7/1981 | Egnell et al. | 431/116 |
| 4,362,500 | 12/1982 | Eriksson et al. | 431/353 |
| 4,466,250 | 8/1984 | Mukaeda | 431/242 |
| 4,488,868 | 12/1984 | Tanaka | 431/353 |
| 4,519,769 | 5/1985 | Tanaka | 431/243 |

FOREIGN PATENT DOCUMENTS

| | | | |
|---|---|---|---|
| 3048044 | 7/1982 | Fed. Rep. of Germany | 431/171 |
| 2262256 | 2/1974 | France | 431/114 |

*Primary Examiner*—Samuel Scott
*Assistant Examiner*—H. A. Odar
*Attorney, Agent, or Firm*—Sughrue, Mion, Zinn, Macpeak, and Seas

[57] ABSTRACT

A cylindrical combustion chamber for use with a hot fog generating machine is provided with a cast iron liner formed in three pieces. Each of the three pieces are spaced from the outer cylindrical shell of the combustion chamber and are provided with longitudinally directed fins which are equally spaced about the circumference of each piece. The fins in each piece are circumferentially offset from the fins on the adjacent piece so as to define a spiral passage for the gasses between the liner and the shell. An inlet is provided through the shell adjacent one end and a fuel injection nozzle and ignition device are provided adjacent the opposite end. The combustion gasses then move downwardly through the liner to an outlet at the opposite end. Upon generation of a backpressure the combustion gasses can pass outwardly of the liner to recirculate with the incoming air.

4 Claims, 3 Drawing Figures

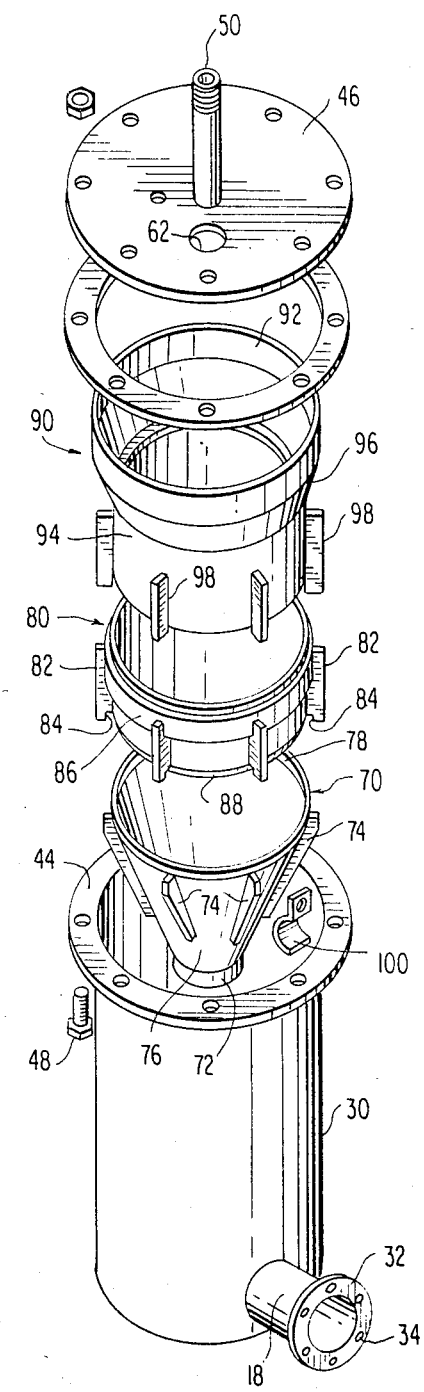
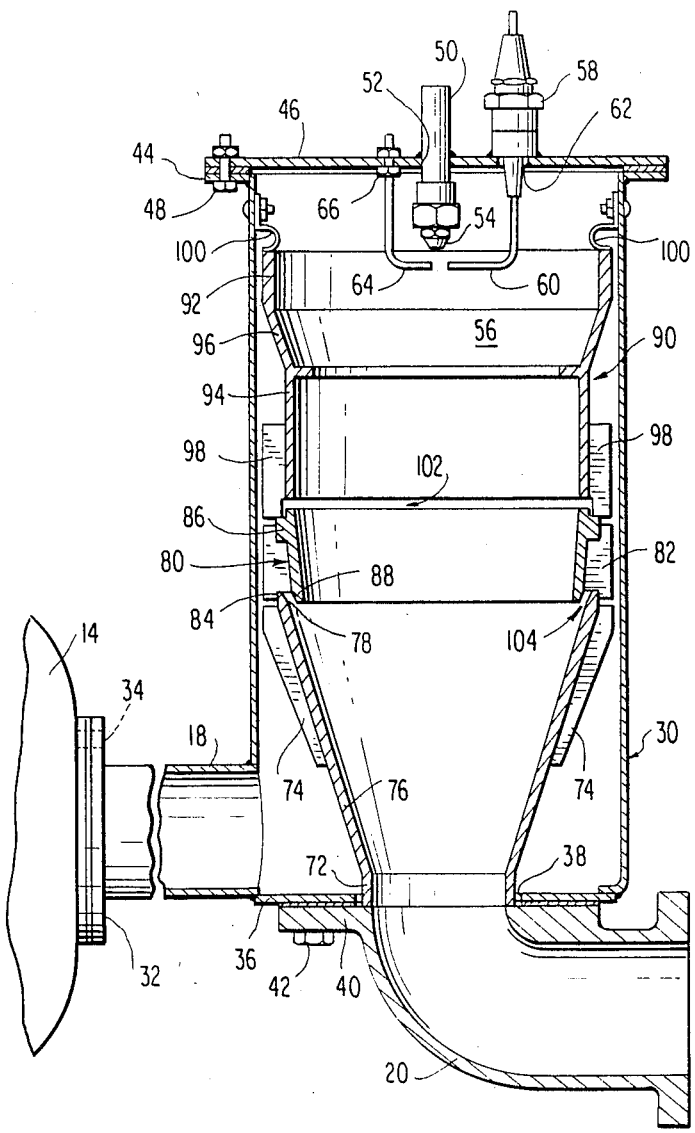
FIG.2
FIG.3

COMBUSTION CHAMBER NOISE SUPPRESSOR

BACKGROUND OF THE INVENTION

The present invention is directed to a combustion chamber noise suppressor, and more specifically to the internal design and construction of a combustion chamber for a fog generating machine for distributing chemical agents throughout a field, orchard, or the like.

The use of machines for generating high temperature fogs to which a chemical has been added is old and well known in the art. Such fog generating machines are normally driven by small two cycle or four cycle engines which drive an air compressor at high speeds. The compressed air is delivered to a combustion chamber where it is mixed with a suitable fuel such as gasoline or diesel fuel and ignited by any suitable means, such as an ingnition wire. The active chemical agent is injected into the exhaust gasses from the combustion chamber which then pass through a fogging nozzle prior to injection into the atmosphere. The noise generated by the internal combustion engine and the air compressor result in excessive noise levels which are not only objectionable from an aesthetic point of view, but also dangerous to the hearing of people operating the fog generating machines.

In the past, attempts have been made to reduce the noise level of a fog generating machine by placing a cylindrical muffler having a plurality of internal baffles at the outlet of the combustion chamber. Other attempts have been made to provide an enclosure for the entire machine with insulating material in an attempt to reduce the noise level surrounding the machine. Neither of these approaches were effective in reducing noise levels by any significant amount.

SUMMARY OF THE INVENTION

The present invention is directed to a new and improved combustion chamber having unique noise suppressing means disposed therein which provide a substantial reduction in the noise level surrounding a machine.

The present invention is directed to a new and improved combustion chamber for a hot fog generating machine comprising a hollow cylindrical combustion chamber shell having a closure plate at one end and outlet means at the opposite end for directing the hot combustion gasses to a fogging nozzle, air inlet means disposed adjacent said outlet means, fuel inlet means and ignition means mounted in said closure plate and liner means disposed concentrically within said cylindrical combustion chamber for controlling the flow of air and combustion gasses within said shell, said liner means including a liner base having a frustro-conical configuration with the smaller end thereof disposed in communication with said outlet means and with the larger end disposed in spaced relation to said shell, a plurality of circumferentially spaced, longitudinally extending fins extending outwardly from said liner base intermediate said liner base and said shell, a cylindrical liner midsection having a plurality of circumferentially spaced fins extending outwardly therefrom between said midsection and said shell with said fins supporting said midsection on said larger end of said liner base to define a circumferentially extending passage between said liner base and said liner midsection and a substantially cylindrical liner throat section having a plurality of circumferentially spaced longitudinally extending fins extending outwardly therefrom between said liner throat member and said shell with said fins supporting said liner throat section on said liner midsection in spaced relation thereto, said fins on said liner base member, said liner midsection and said liner throat being circumferentially spaced in a spiral arrangement to define a spiral passage for air from said inlet means to the portion of said combustion chamber adjacent said fuel inlet means and ignition means.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 2 is an exploded perspective view of the combustion chamber according to the present invention.

FIG. 3 is a vertical cross sectional view of the combustion chamber according to the present invention.

DETAILED DESCRIPTION OF THE INVENTION

Figure 1:
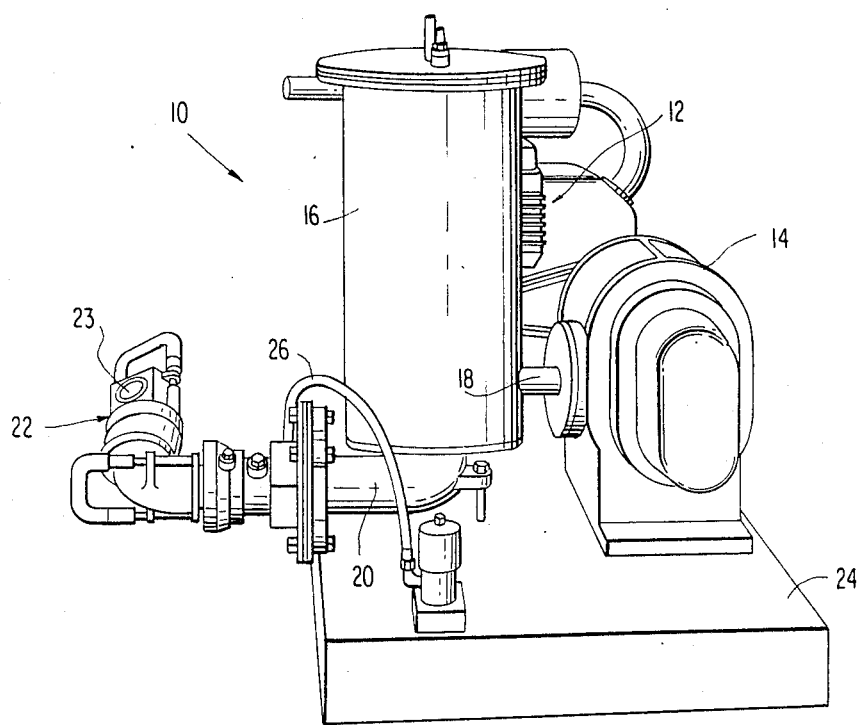
FIG. 1 is a perspective view of a fog generating machine having a combustion chamber according to the present invention.

The hot fog generating machine according to the present invention, which is illustrated in FIG. 1, is comprised of an internal combustion engine 12 which drives an air compressor 14. The compressed air from the air compressor 14 is supplied to the combustion chamber 16 by means of the connecting conduit 18. The compressed air and a suitable fuel, such as gasoline or a diesel fuel, are mixed within the combustion chamber 16 and the exhaust gasses are expelled under high pressure and velocity through the outlet conduit 20 to a fog generating nozzle 22. All of the aforementioned elements may be mounted on a self-contained portable platform 24. A suitable agricultural chemical, such as a herbicide, insecticide, fungicide, or the like, may be supplied through a conduit 26 to the hot combustion gasses in the vicinity of the outlet conduit 20. All of the aforementioned elements, with the exception of the combustion chamber, are old and well known in the art, and a detailed discussion of the construction and operation of the old and well known elements is not deemed necessary for one skilled in the art to understand the present invention.

The novel combustion chamber according to the present invention is comprised of a hollow cylindrical combustion shell 30 which is provided with an integral inlet conduit 18 which opens through the cylindrical side wall of the combustion chamber adjacent one end of the shell 30. The inlet conduit 18 is provided with a flange 32 having a plurality of bolt holes 34 to facility the connection of the inlet conduit 18 to the outlet of the compressor 14. The end of the shell 30 adjacent the inlet conduit 18 is provided with a closure plate 36 having a central aperture 38. The outlet conduit 20 is provided with a mounting flange 40 which is secured to the closure plate 36 by means of bolts 42 with the interior of the conduit centered on the opening 38. The opposite end of the shell 30 is provided with a circumferential flange 44 and a closure plate is secured to the flange 44 by means of nut and bolt assemblies 48. A fuel conduit 50 extends through a central aperture 52 in the end closure plate 46 and a spray nozzle 54 is mounted on the end of the fuel conduit 50 within the combustion chamber 56. An ignition device 58 is also mounted on the end closure plate 46 with an electrode 60 extending through an aperture 62 in the end closure plate 46. A ground wire 64 extends through the end closure plate 46 and is secured thereto by means of nuts 66. A gap between the ground wire 64 and the electrode 60 is closely spaced from the end of the spray nozzle 54 to facility the ignition of the fuel-air mixture within the combustion chamber 56.

In order to control the flow of combustion air within the combustion chamber 56, a concentric, three piece liner is mounted within the hollow cylindrical combustion chamber shell 30. A liner base 70 having a frustroconical configuration is mounted within the shell 30 with the smaller diameter end portion 72 resting on and aligned with the outlet conduit 20. A plurality of circumferentially spaced apart fins 74 protrude outwardly from the conical portion 76 of the liner base 70. The fins 74 may be tapered from a relatively narrow end portion adjacent the middle of the conical portion 76 to a wider portion adjacent the uppermost end of the liner base 70. A circle through the outermost upper ends of the fins 74 has a diameter slightly less than the internal diameter of the shell 30 so as to permit a sliding insertion of the liner base into the shell during assembly while acting to center the liner base relative to the outlet conduit 20. As illustrated in the drawing, six equally spaced fins 74 have been provided about the circumference of the liner base 70, but the number can vary.

A liner midsection 80 is located above the liner base 70 and has a generally hollow cylindrical configuration. A plurality of fins 82 extend outwardly from the liner midsection 80 in equally spaced relation about the circumference thereof. A circle encompassing the outer periphery of each of the fins 82 has a diameter slightly less than the internal diameter of the shell 30 so that the liner midsection may slide into engagement with the liner base member during assembly while still centering the liner midsection within the shell 30. The bottom of the liner midsection 80 and the top of the liner base member 70 are beveled to provide complementary parallel spaced apart surfaces 88 and 78, respectively, which define a circumferential passage between the liner midsection member and the liner base member. Each of the fins 82 is provided with a notch 84 adjacent the beveled surface 88 of the midsection member 80 whereby the midsection member 80 is supported on the uppermost end of the liner base member 70 by means of the fins 82. The third member of the internal liner structure is comprised of a liner throat 90 having a first cylindrical portion 92 with an external diameter slightly less than the internal diameter of the shell 30, a second cylindrical portion 94 having an external diameter substantially equal to the external diameter of the liner midsection member 80 and a frustroconical portion 96 interconnecting the two cylindrical portions 92, 94. A plurality of equally spaced fins 98 are provided about the external circumference of the cylindrical portion 94. Each of the fins extends a substantial distance below the lower end of the cylindrical portion 94 and rests on an external circumferential projection 86 on the liner midsection member 80. The dimensions of the fins 98 relative to the projection 86 is such that the lowermost end of the cylindrical section 94 of the liner throat member 90 is spaced from the uppermost end of the liner midsection member 80 to define a circumferential passage. A plurality of spring clips 100 are secured to the internal surface of the shell 30 adjacent the flange 44 with the spring portion of the clips bearing against the uppermost end of the cylindrical portion 92 of the liner throat member 90. Thus, the three liner members 70, 80, and 90, are held under tension against the exhaust conduit 20 by means of the force of the spring clip 100.

All of the fins 84, 82, and 98, extend longitudinally relative to the central axis of the combustion chamber 56 with each set of fins being circumferentially offset relative to each other so as to define a spiral flow path for the compressed air. In operation, the compressed air is introduced through the inlet conduit 18 to the bottom of the combustion chamber 56 externally of the frustroconical shaped liner base member 70. As the compressed air moves about the liner base member 70, the compressed air will be directed upwardly by means of the fins 74. Since the fins 82 are circumferentially offset from the fins 74, the upward flow of air will be shifted laterally and since the fins 98 are circumferentially offset from the fins 82, the upward flow of air will again be laterally shifted so as to define an overall upward spiral path for the compressed air. When the compressed air reaches the vicinity of the liner throat member, the compressed air will be introduced under high velocity into the combustion chamber 56 through the circumferential passage 102 between the liner throat member 90 and the liner midsection member 80. Some additional air will be introduced into the combustion chamber 56 between the uppermost end of the liner throat member 90 and the shell 30. The compressed air will mix with the combustion gasses from the ignited fuel due to the turbulence of the compressed air and the mixture of hot gasses will exit downwardly through the outlet conduit 20 at the bottom of the combustion chamber. Due to the presence of the fogging nozzle 22, which is mounted at the outlet end of the outlet conduit 20, a backpressure occurs with respect to the exhaust gasses. A portion of the exhaust gasses are therefore recirculated outwardly of the liner through the upwardly angled passage 104 between the liner midsection member 80 and the liner base members 70. The large volume of the combustion chamber 56 above the main air inlet passage 102 provides a substantial cushion for the hot exhaust gasses upon occurrence of a back pressure. Thus, the provision of the spiral inlet passage for the compressed air, the restricted introduction of the compressed air into the combustion chamber through the passage 102, the recirculation of the combustion gasses upon the occurrence of backpressure through the passage 104, and the large upper volume of the combustion chamber, which provides a cushioning effect, all contribute to a substantial reduction of the noise emmanating from the nozzle head 22. The foregoing elements also prevent the backpressure from reaching the compressor and therefore substantially contribute the quiet running of the compressor.

Comparison testing relative sound levels was carried out between a fog generating machine utilizing the combustion chamber according to the present invention and a fog generating machine according to a prior art construction utilizing a conventional combustion chamber with a cylindrical silencer having a plurality of internal baffles therein. The sound meter was located immediately adjacent the outlet 23 of the fog generating nozzle 22 for the prior art arrangement and an arrangement utilizing the novel combustion chamber of the present invention. The sound for the prior art device was approximately 96 dcb, and the sound for the device according to the present invention was 90 dcb. The sound meter was also held near the compressor 14 adjacent the conduit 18 in both instances. The sound level for the prior art device was measured at 90 dcb, whereas the sound level for the device according to the present invention was measured 85 dcb. Finally, the sound meter was located adjacent the exhaust for the internal combustion engine in both devices. The sound level for the engine according to the prior art arrangement was 85 dcb, whereas the sound level for the engine according to the present arrangement was 82 dcb. Thus, the sound levels for all three major components of the system were substantially reduced by utilizing the novel combustion chamber according to the present invention having the unique liner arrangement therein. It is speculated that the recirculation of the combustion gasses through the passage 104 and the cushioning effect of the upper portion of the combustion chamber 56 upon the occurence of the backpressure caused by the nozzle convert the high level of sound waves into heat due to the turbulence, which heat is then dissapated through the liner members 70, 80, and 90, as well as the shell 30, to substantially reduce the noise levels emmanating from the nozzle. The liner members 70, 80, and 90, as well as the shell 30, the end plate 46, and the inlet and outlet conduits 18 and 20, may all be constructed of cast iron or heavy gauge steel so as to aid in the dissapation of heat generated by the turbulence of the air.

While the invention has been particularly shown and described with reference to a preferred embodiemnt thereof, it will be understood by those in the art that various changes in form and details may be made therein without departing from the spirit and scope of the invention.

What is claimed is:

1. A combustion chamber for a hot fog generating machine comprising a hollow cylinderical combustion chamber shell having a closure plate at one end and outlet means at the opposite end for directing hot combustion gasses to a fogging nozzle, air inlet means disposed adjacent said outlet means, fuel inlet means and ignition means mounted in said closure plate and liner means disposed concentrically within said cylindrical combustion chamber for controlling the flow of air and combustion gasses within said shell, said liner means including a liner base having a frustroconical configuration with the smaller diameter end thereof disposed in communication with said outlet means and with the larger diameter end thereof disposed in spaced relation to said shell, a plurality of circumferentially spaced, longitudinally extending fins extending outwardly from said liner base intermediate said liner base and said shell, a cylindrical liner midsection having a plurality of circumferentially spaced fins extending outwardly therefrom between said midsection and said shell with said fins supporting said midsection on said larger diameter end of said liner base to define a circumferentially extending passage between said liner base and said liner midsection and a substantially cylindrical liner throat section having a plurality of circumferentially spaced longitudinally extending fins extending outwardly therefrom between said liner throat member and said shell with said fins supporting said liner throat section on said liner midsection in spaced relation thereto, said fins on said liner base, said liner midsection and said liner throat being circumferentially spaced in a spiral arrangement to define a spiral passage for air from said inlet means to the portion of said combustion chamber adjacent said fuel inlet means and ignition means.

2. A combustion chamber as set forth in claim 1 wherein the lower end of said liner midsection and the upper end of said liner base are provided with parallel beveled spaced apart surfaces to define an upwardly and outwardly extending circumferential passage for the recirculation of combustion gasses upon the occurence of backpressure at said outlet means.

3. A combustion chamber as set forth in claim 1 wherein said liner means are constructed of cast iron material to facilitate the absorption and dissipation of heat generated by air turbulence.

4. A combustion chamber for a hot fog generating machine comprising a hollow cylindrical shell, a liner disposed within said shell in concentric spaced relation to said shell to define an air inlet passage between said sheel and said liner and a combustion chamber within said liner, a closure plate secured to and closing one end of said shell in spaced relation to said liner, fuel inlet means and ignition means mounted on said closure plates, an air inlet extending through said cylindrical shell adjacent the end opposite said closure plate in communication with said air inlet passage, outlet means for combustion gasses secured to the end of said cylindrical shell opposite said closure plate in communication with said combustion chamber and spacer means extending outwardly from said liner towards said shell to space said liner from said shell and to direct air from said inlet in a spiral path through said air inlet passage towards said closure plate, said liner being comprised of three coaxial members having means/separating said members in the axial direction to define a first passage means providing for the recirculation of exhaust gasses to said combustion chamber through said air inlet passage and second passage means located between said first passage means and said closure plate for allowing a portion of the air in said air inlet passage to enter said combustion chamber/at a point spaced from said closure plate with the remainder of the air in said air inlet passage entering said combustion chamber between said liner and said closure plate.

* * * * *